June 22, 1954  J. VAN ACKEREN  2,681,799
RADIAL SPRAY TYPE GAS AND LIQUID SCRUBBER
Filed June 26, 1952  2 Sheets-Sheet 1

GAS →
LIQUID →

INVENTOR.
JOSEPH VAN ACKEREN
BY
Thomas J. P. O'Brien
ATTORNEY.

Patented June 22, 1954

2,681,799

UNITED STATES PATENT OFFICE 2,681,799

RADIAL SPRAY TYPE GAS AND LIQUID SCRUBBER

Joseph van Ackeren, Pittsburgh, Pa.

Application June 26, 1952, Serial No. 295,672

5 Claims. (Cl. 261—21)

The present invention relates in general to apparatus for intimate contact of gas with liquid in the form of a spray, to remove constituents of the gas by the liquid or to remove constituents of the liquid by means of the gas.

More particularly, the invention is directed to improvements in the stage treatment of gas and liquid in spray type scrubbers or washers of the kind in which the gas and liquid are repeatedly brought into contact with each other in stages, with counterflow of gas and liquid in the form of fine spray in each stage, and countercurrent flow of gas and liquid from stage to stage, to approach equilibrium conditions in each stage between the gas and liquid with respect to the constituent to be removed.

With the present invention, more effective and efficient contact of gas and liquid is attained by introducing the gas in each stage through baffled slots from a gas distribution chamber to distribute the same so as to flow uniformly across a spray scrubbing chamber countercurrent to a spray of liquid, and then withdrawing the gas from the scrubbing chamber through restricted outlet ports through which the liquid spray enters the scrubbing chamber.

The spray heads are set beyond the outlet ports so as to cover them with spray as it enters the scrubbing chamber. Thus, all gas is constrained to flow at highest velocity through the fine and more closely spaced globules of liquid in outlet orifices through which the liquid is being sprayed countercurrently to the flow of gas. The baffles for the slots deflect the spray from the slots so that the spray does not enter the distribution chamber but instead drops back into the scrubbing chamber for retention therein until the liquid approaches equilibrium with the constituents of the gas.

From the scrubbing chamber the gas is de-entrained of spray at a velocity much lower than the velocity at which it entrains spray on passing through the orifices. Preferably, this is done by means of unpacked chambers affording a drop in velocity to a rate nearly as low as that rate at which the gas flows in the scrubbing chamber before entering the higher velocity areas of the outlet orifices, together with centrifuging action resulting from a sudden change in direction of flow of the gas while flowing through the de-entrainment area of each stage.

The present invention incorporates the foregoing features in a different embodiment of stage treatment from the embodiments in which they have been incorporated in a copending application for Spray Type Gas and Liquid Scrubber and Method, executed June 5, 1952, Case 50:85, Serial No. 293,251 filed June 13, 1952.

In said embodiments such features are incorporated in stages involving in one embodiment vertical gas flow, and in the other embodiment horizontal gas flow, both at a constant and uniform rate throughout the spray scrubbing and spray de-entrainment stages.

The vertical flow embodiment involves placing the spray heads within the de-entrainment chambers into which entry must be made for adjustment, cleaning and repair of the spray heads.

The other embodiment with horizontal gas flow eliminates this disadvantage by having the spray heads along the inside of the shell where they are readily accessible from the exterior of the shell. The chambers extend from the shell on one side to the shell on the opposite side of a diameter of the shell, and have vertical gas risers along the inside of the two opposite sides of the shell.

The present embodiment is directed to incorporating the novel flow features in a shell structure that provides for ready access to the spray heads from the exterior of the shell in a manner that is more simple and more economical to construct the shell and the stages within the same than is the case with the horizontal gas flow embodiment with its ready access to the spray heads from outside the shell.

With the present embodiment, these objects are attained by incorporating the aforesaid features of constraining all the gas to pass through outlet orifices through which liquid is being sprayed countercurrently to the flow of gas in the form of fine sprays together with baffle inlet slots in unpacked stages of axial and surrounding annular chambers arranged one above the other for gas flow in series therethrough. Each stage comprises a lower gas distribution and spray scrubbing area and an upper spray de-entrainment area. The lower area is in the form of an inner axial gas distribution chamber, an outer perimetrical annular gas outlet chamber and an intermediate annular gas spray scrubbing chamber, and the upper area is in the form of an outer perimetrical annular gas inlet chamber, an inner axial cylindrical gas outlet chamber and an intermediate annular chamber. The chambers of the upper area are connected together for effecting a sudden change in direction of flow of gas flowing therethrough. The outer chamber of each upper area receives the gas from the outer chamber of the lower area below while the inner axial chamber of each upper area delivers gas to the inner axial gas distribution chamber of the lower area of the next stage above. Each lower area is provided with a partition between the inner axial gas distribution chamber and the intermediate scrubbing chamber, which partition is provided with slots for distribution of the inflowing gas and baffles overlying the slots. Each lower area is also provided with a partition between the outer perimetrical chamber and the intermediate chamber, which partition is provided with restricted outlet orifices for constraining all gas to flow through the ports at highest velocity from the intermediate chamber to the outer chamber. The nozzles are arranged for spraying liquid across the scrubbing chamber and against the partition having the gas inlet slots. These nozzles are located in the outer perimetrical gas outlet chamber of the lower area of each stage and are set to discharge the spray into the scrubbing chamber through the restricted outlet ports in the partition between the outlet chamber and the intermediate scrubbing chamber so as to cover the gas outlet ports with the spray of liquid where the liquid is closest to the spray head and in the form of fine and closely spaced gloubles before the spray globules coalesce, whereby all gas in the scrubbing chamber is forced to pass at highest velocity through the more intense portion of the spray on its way to the gas outlet chamber of each stage. The baffles overlying the inlet slots of the partitions of the lower area of each stage are arranged relative to the nozzles to deflect the spray from the slots into the scrubbing chamber so that the liquid cannot pass into the gas distribution chamber. The outer, intermediate, and inner axial chambers of the upper area of each stage are at least the same size, and correspond in shape, and are axially aligned with, the corresponding outer, intermediate, and inner axial chambers of the lower area of their respective stages, for effecting the efficient de-entrainment of greater amount of carryover spray that results from the fact that all the gas which leaves each scrubbing chamber leaves at highest velocity in contact with the more intense portion of the sprays in the gas outlet orifices.

With the apparatus of the present invention, the gas is first washed or scrubbed in each stage by the countercurrent flow of the liquid in the form of a fine spray under pressure from the nozzles and thereafter is subjected to de-entrainment or dis-engagement in each stage, in a manner to eliminate the use of packed towers or bubble cap trays for attaining effective contact of the gas and liquid, and thereby make possible the processing of the gas or liquid to be treated with a low and uniform pressure drop and freedom from plugging of packing in the scrubber or washer.

The processing of the gas or liquid may involve a single pass of the liquid in the form of a spray through the respective stages, or repeated passes of the liquid in the form of fine spray through the respective stages by collecting the sprayed liquid in each stage and conveying the same back to the spray heads for the individual stages until the liquid approaches equilibrium with the gas in the respective stages.

To attain the essential equilibrium conditions with this type of scrubber with the advantages over conventional scrubbers or washers of the bubble cap tray and packed column type, of a low pressure drop and freedom from the possibility of plugging of packing, such spray type washers should provide adequate contact of all of the gas with all of the spray in each stage, with no chance for part of the gas or the liquid of the spray to short circuit through the washer or scrubber without being thoroughly mixed in each stage.

Carry over of liquid with the gas from stage to stage in the wrong direction must be kept to a minimum. Pressure drop of the gas, in passing through the washer must be kept low. The quantity of liquid recirculated over each stage must be kept reasonably low. Theoretically, each stage would represent one equilibrium stage if the efficiency of contact were 100%. By recirculating large quantities of liquid over each stage, an equilibrium efficiency approaching 100% might be reached. In practice a compromise must be taken between the lower efficiency obtained with lower recirculating rates and the higher costs incurred at higher recirculating rates.

The passage of gas at high velocity countercurrently through a spray of liquid where the liquid is closest to the spray head and is in the form of closely spaced fine globules, before the spray globules coalesce is the most effective and efficient manner of effecting intimate contact of the gas and liquid.

However, the conditions of the spray at this region of the spray head which lend themselves most effectively for contact of the liquid and gas, that is, fineness and closeness of globules, also are the most favorable conditions for carryover of spray with the gas under countercurrent flow conditions, especially under high gas velocities.

In the prior art, when it was sought to take advantage of the greater intensity of the spray in its most concentrated form for intimacy of contact by forcing all of the gas to pass through the same in countercurrent in each contact stage, by causing the gas to converge towards spaced gas outlets from a spray chamber having spray heads set therein to release the spray into the spray chamber at the inner region of the outlets before the gas could pass out to a spray de-entrainment chamber, much of the advantage was lost since the gas is at its highest velocity in passing through the outlets and at that time is not in contact with the spray from the nozzles, but instead flows through the unsprayed space around the portion of the spray heads in the gas outlets, and the de-entrainment was carried out at a gas velocity much higher than the velocity of the gas in the spray chamber before its acceleration in velocity in passing through the restricted outlets, with the result that much of the liquid constituents remained in the gas leaving the scrubbing apparatus, even though reliance was placed on centrifugal force to throw entrained liquid out of the gas stream during its flow at high velocity through the de-entrainment spaces.

To overcome this, it has been proposed to have the gas leave each spray chamber through unobstructed gas spaces around the cones of liquid from the jets before undergoing centrifuging in separate gas de-entrainment chambers leading to a next spray chamber, so that the gas, after passing through the wider divergent portions of the spray cones, then passes around, instead of through, the finer more concentrated portion of the spray cones closest to the jets, and thereby deposit any droplets of liquid entrained by the gas. While this may prevent carry over of spray by the gas, it results in inefficient scrubbing of the gas by the spray, since it fails to utilize the most effective portion of the spray cones for intimate contact of gas, and may also result in insufficient absorption of constituents from the gas or liquid.

The invention provides for the more efficient scrubbing of gas with liquid in stages as aforesaid in a manner to employ the more effective and efficient action of the portion of the spray cones where the liquid is closest to the spray heads together with de-entrainment in a manner in which there is substantially no carry over by the gas from stage to stage of liquid from the sprays.

The invention effects the stage treatment of the gas and liquid in each stage by means of sprays in an unpacked spray area of axial and surrounding annular chambers followed by de-entrainment of spray in unpacked de-entrainment areas of unpacked axial and surrounding chambers in which the liquid is sprayed into the spray chamber by spray heads set beyond gas outlet ports from the spray chamber so as to cover said ports with the spray as it enters the spray chamber, whereby all the gas on leaving the spray chamber is constrained to pass at its highest velocity through the narrower portion of the spray flowing in through the gas outlet ports before the gas enters the de-entrainment chamber.

The invention also provides for the treatment of gas and liquid in stages in each of which all of the gas leaving a spray chamber is forced to pass through orifices through which the liquid is being sprayed countercurrently to the flow of gas by spray heads set beyond the orifices to cover them with the spray, and then is passed circuitously through a de-entrainment area of chambers of substantially the same depth and diameter as, and in axial alignment with, axial and surrounding annular chambers of the spray area of the same stage, whereby the gas is gravitationally de-entrained in conjunction with centrifugal force at a velocity lower than the velocities at which the gas entrains liquid in passing through the orifices.

More specifically, the invention contemplates the carrying out of the foregoing objects by axially distributing the gas at a high velocity through passages spaced over the entire area of the inner periphery of an annular spray scrubbing chamber, as the gas enters the same, then flowing the gas radially outwardly at relatively low velocity through overlapping cones of spray in a surrounding annular spray scrubbing chamber, and discharging the gas at its highest velocity from the outer periphery of the spray chamber through the more intense portion of the spray of the cones flowing from spray heads through restricted orifices before the gas enters the spray de-entrainment area, and carrying out the foregoing features in a vertical tower with the stages arranged one above the other with countercurrent flow of gas and liquid from top to bottom but in a zig-zag manner alternately in opposite direction in adjacent scrubbing and de-entrainment areas, with the gas flow radially outward in the same direction in all of the spray scrubbing chambers from the axial center of the tower to the outer shell of the tower, and the flow through all of the intermediate de-entrainment chambers towards the axial center of the tower in the same direction as each other but in direction opposite to the direction of flow in the spray scrubbing chambers, the partitions with inlet distributing slots being annular and vertically disposed along the axis of the tower forming axial gas distribution chambers connecting with a like annular and vertically disposed partition forming the axial gas outlet chamber of the de-entrainment area below; and the partitions with outlet orifices likewise being vertically disposed annularly alongside the spray scrubbing chambers in spaced relation with the shell radially outward of the inlet partitions and forming perimetrical gas outlet chambers connecting with a like gas inlet chamber for the spray deentrainment area above.

With this zag-zag arrangement the spray heads are located in the riser gas outlet chamber and disposed with their nozzles set to discharge the liquid horizontally into the spray scrubbing chambers in the form of a fine spray through the outlet orifices so as to cover said outlets with the more intensive part of the liquid spray as the gas flows out at its highest velocity through the outlet orifices countercurrent to the spray. The spray heads are connected to distributing headers outside the tower at the different levels of the spray chambers and the inlet slots to the spray scrubbing chambers are provided with liquid deflectors or baffles which overlie the slots and prevent liquid of the sprays from passing through the gas inlet slots to the axial gas distribution chamber.

The spray nozzles are arranged in such spaced relation to each other that the conical sprays overlap each other in the spray chambers and hence all the gas must pass progressively through the most divergent portion of the spray towards the narrowest and more intense portion of the sprays in passing through the spray chambers.

With the apparatus as described, all the gas flows axially into each scrubbing area and peripherally enters each spray gas scrubbing chamber at a high velocity in passing through the inlet slots, flows at a relatively low velocity radially outward countercurrently to cone sprays in the spray gas scrubbing chambers and then flows out of the gas spray scrubbing chambers at its highest velocity through the freshest portion of the spray in its most intense form in the outlet orifices, whereupon the velocity of the spray decreases in each gas outlet chamber and each de-entrainment area to a rate below the accelerated rate of the gas on leaving the spray chambers at highest velocity in contact with the most intense portion of the cone of the sprays. In flowing through the de-entrainment area, the gas is subjected to a sudden change in direction of flow due to the upflow in the outer annular gas inlet chamber, downflow during its radial inward flow through the intermediate annular chamber to the inner axial gas outlet chamber whence the gas turns axially upward to the next stage. As a consequence all of the gas is brought into contact with the denser portion of the spray at a condition most favorable for contact and is then reduced in velocity to a rate at which, together with the centrifugal force of the sudden change in direction of gas flow, the spray entrained at such high velocity loses the velocity required to suspend it in the gas current before the gas reaches a next stage.

Preferably the spray is collected in each gas spray scrubbing chamber and recirculated again over the same spray gas scrubbing chamber at a higher rate than the rate at which fresh liquid is introduced to the topmost stage, and a mist eliminator is placed above the de-entrainment area of the topmost stage, and the excess liquid in each stage is conveyed to a next lower stage in the series, the liquid from each spray gas scrubbing chamber either overflowing into the next lower de-entrainment area and then being passed together with de-entrained liquid into mixture with liquid collecting in the lower gas scrubbing chamber for respraying in that stage, or else passing directly to liquid collecting in the next lower spray gas scrubbing chamber, for respraying therein, along with de-entrained liquid overflowing thereto from the de-entrainment area above.

Other objects and advantages of the invention will be apparent from the following description of the preferred embodiment of the method and apparatus.

The apparatus of the present invention is particularly adapted for scrubbing benzol from coke oven gas as one of a series of steps usually employed in coke oven by-product or chemical recovery plants for processing coke oven gas as it leaves the coke oven batteries in which the gas is distilled off in coking coal to produce metallurgical coke for blast furnaces, for foundry coke, and the like, as well as coke for domestic consumption.

However, the method and apparatus of this embodiment is not limited solely to such application, but is equally applicable to scrubbing of such coal or coke oven gas in the same chemical recovery product train of apparatus, as ammonia washers for absorbing ammonia, as absorbers for removing hydrogen sulfide, hydrogencyanide and similar chemical impurities, from the coke oven gas or other process gas, and as primary coolers for cooling and condensing water vapor from the coke oven gas or other process gas, and as final coolers for cooling and condensing water vapors from coke oven gas or similar process gas in the coke oven by-product chemical recovery train of apparatus before treatment for absorption of its light oil content, as in the benzol scrubbing step and apparatus.

Though not limited thereto, the method and apparatus are also suitable to and adapted for removal of naphthalene from the coke oven gas and other process gas.

The novel features of the present invention are not limited, in all its aspects, to processing such coke oven gas since they are especially suitable also for stripping liquid by means of gas such as, for instance, phenol removal towers for stripping phenol from ammonia liquor or other similar plant wastes, as occur in such chemical recovery coke oven by-product plants.

The novel features of the invention are also especially suitable as coolers for reformed natural gas, water gas, oil gas, etc., for cooling and removing water vapor from these gases, as well as coolers and scrubbers for producer gas to cool the gas and remove dust carried over from the producers.

Hence, the novel features of invention, are not confined to the specific use, and specific embodiment of scrubbing benzol from coke oven gas, hereinafter set forth as an illustrative example.

In the accompanying drawings forming a part of this specification and showing for purposes of exemplification, a preferred form and manner of embodying the invention, but without limiting the claimed invention, in all its aspects, to the embodiment illustrated:

Figure 1:
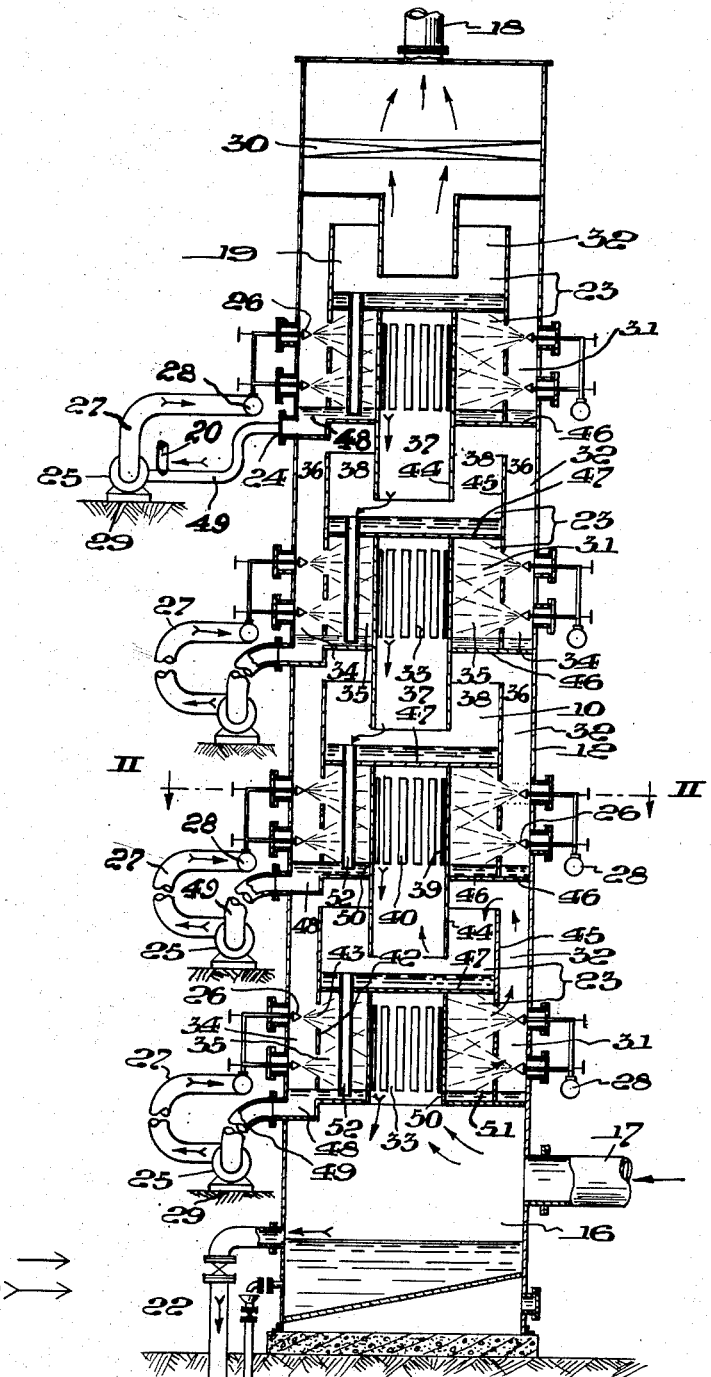
Figure 1 is a vertical cross-sectional view of a scrubbing tower incorporating the present invention.
Figure 2:
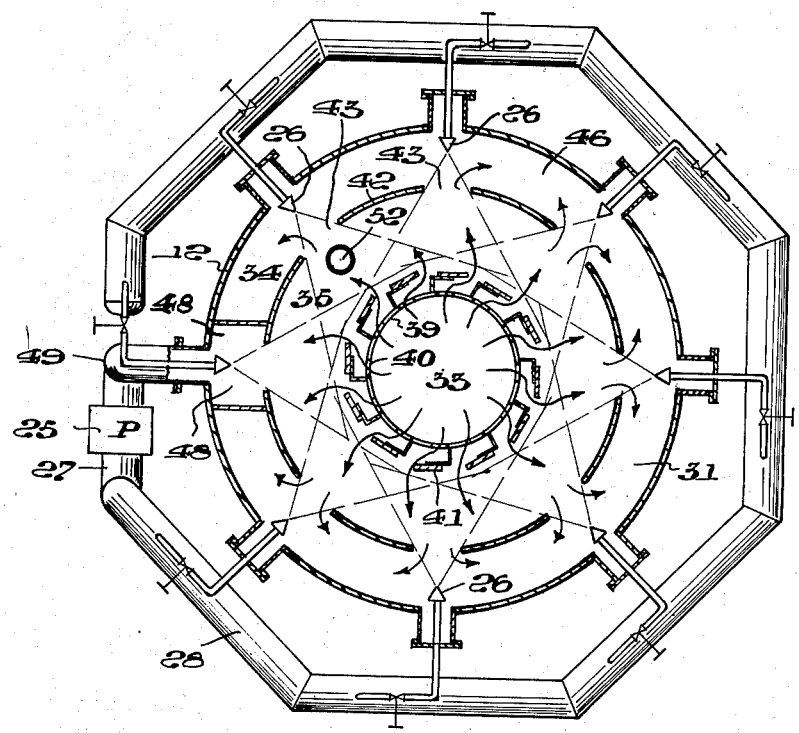
Figure 2 is a horizontal cross-sectional view taken on the line 2—2 of Figure 1.

Referring to Figs. 1 and 2, the washer or scrubber there shown is of the single pass cylindrical type having a vertical gas pass 10, in a single cylindrical shell 12.

Benzol laden gas to be debenzolized or scrubbed to strip it of its benzol content is admitted to the lowermost portion 16 of the pass 10 by means of lower gas inlet 17, and after flowing upwardly through pass 10, finally passes out through the upper gas outlet 18 substantially free of the content of benzol to be removed from the gas by means of an absorbent liquid solvent for benzol, such as straw oil.

The liquid absorbent oil solvent is first introduced by means of line 20 into contact with the gas as fresh debenzolized absorbent liquid at the top 19 of the pass 10, whence it is made to flow countercurrently to the flow of the gas in a generally downwardly direction through the pass 10 until it reaches the bottom 16 of the pass 10, enriched in benzol absorbed from the gas.

The benzol-enriched absorbent leaves the scrubber 12 through a liquid outlet 22 at the bottom 16 below the gas inlet 17 where the gas first enters the scrubber.

For absorbing the benzol, or light oil from the gas such as coke oven gas with intimate contact of the gas and liquid during their flow countercurrently through the pass 10, by means of fine sprays of the liquid, in the absence of packing as heretofore conventionally used, for redistribution and intimacy of contact of the gas and liquid during their countercurrent flow, it is necessary to expose the gas to a relatively large surface of the oil by spraying the absorbent oil into the gas in the form of small droplets.

To obtain sufficient contact and absorption efficiency, the oil is resprayed in a number of stages 23 countercurrent to the flow of gas.

For this purpose there are arranged, between the upper liquid inlet 20 and upper gas outlet 18 on the one hand, and the lower liquid outlet 22 and lower gas inlet 17 on the other hand, a number of stages 23 which are designed to provide adequate contact between oil spray and gas, with no chance for any part of the gas or oil to short circuit through the washer 12 without being thoroughly mixed. In these stages, carryover of oil with the gas from stage 23 to stage 23 in the wrong direction is kept to a minimum. Pressure drop of the gas, in passing through the washer or scrubber 12, from gas inlet 17 to gas outlet 18, is kept low comparably to that favored with packed towers. The quantity of oil required to be recirculated over each stage is reasonably low to reach an equilibrium efficiency in each stage 23 approaching 100 per cent.

The fresh oil is fed to the first or topmost stage 23 by the line 20 and may or may not be recirculated over that stage 23, to provide for a final cleanup of last traces of benzol from the gas before it flows out through gas outlet 18. When the fresh oil to the first stage is not to be recirculated therein, a blanked-off outlet (not shown) is provided at 24 for the connecting line 49 leading from the well 48 to the line 27 that leads to the header 28 for the uppermost stage in case it should be desired to later provide for recirculation in this stage, and the oil from the first stage is then passed unrecirculated to the next lower stage.

The oil is dispersed into the gas in the topmost stage, and re-dispersed into the gas in that stage and in each subsequent stage, as a fine spray by means of recirculating pumps 25 which pump the oil through conical spray heads or nozzles 26 through lines 49, 27 and headers 28 at pressures of from 5 p. s. i. g. to 50 p. s. i. g. pressure.

The recirculating pumps 25 are provided for each lower stage 23, with a capacity for spraying a larger volume than the volume of the freshly debenzolized wash oil fed to the washer 12 by line 20. The pumps 25 may all be located at ground level as indicated at 29.

Above the topmost or last stage 23, and above the conical spray heads 26 for the fresh oil feed from line 20, but below the gas outlet 18, a mist eliminator 30 is disposed in the path of the gas leaving the last stage 23 and passing to the gas outlet 18.

Each stage is constituted of an unpacked lower gas distribution and spray scrubbing area 31 and a separate upper unpacked spray de-entrainment area 32 in which the oil is sprayed horizontally across the lower unpacked spray area 31, and carry over oil is de-entrained or disengaged from the gas in the separate upper spray de-entrainment area 32.

Each gas scrubbing area 31 comprises an inner axial gas distribution chamber 33, an outer perimetrical annular gas outlet chamber 34, and an intermediate annular spray gas scrubbing chamber 35.

Each spray de-entrainment area 32 comprises an outer perimetrical annular gas inlet chamber 36, an inner axial gas outlet chamber 37, and an intermediate annular radial inflow chamber 38.

Each spray area 31 is provided at the axial center of the tower with a vertical cylindrical partition 39 having a multiplicity of horizontally vertical slots 40 between the inner axial gas distribution chamber 33 and the intermediate scrubbing chamber 35, for distributing the gas horizontally radially outwardly over the entire vertical cross-sectional area of the spray scrubbing chamber 35, for redistribution of the gas in each stage during its flow through the scrubber.

These slots 40 are provided with baffles in the form of adjustable louvres 41, Fig. 2, for deflecting spray from passing through the slots 40. These slots 40 and their baffles 41 are designed to assure uniform flow of gas with a minimum of pressure drop.

Each spray scrubbing area 31 is also provided nearer the outer periphery of the shell 12 with a vertical cylindrical partition 42 having a multiplicity of gas outlet orifices 43, disposed over the entire vertical cross-sectional area of scrubbing chamber 35, between the outer perimetrical gas outlet chamber 34 and the intermediate gas scrubbing chamber 35, for constraining or forcing all the gas to pass horizontally through the restricting orifices 43 on its way to its spray de-entrainment area 32. These orifices also are designed to assure uniform flow of gas with a minimum pressure drop.

Each spray de-entrainment area 32 is provided at the axial center of the tower with a vertical cylindrical partition 44 between its inner axial gas outlet chamber 37 and its intermediate annular radial inflow chamber 38, and each spray de-entrainment area is also provided nearer the outer periphery of the shell 12 with a vertical cylindrical partition 45 between its intermediate annular chamber 38 and its outer perimetrical gas inlet chamber 36.

The corresponding chambers and partitions of the areas 31 and 32 are in axial alignment with each other.

Each area 31 has a lower horizontal partition 46 which forms the bottom of its gas scrubbing chamber 35 and its gas outlet chamber 34, as well as forming the tops of the outer gas inlet chamber 36 and the intermediate annular chamber 38 of the de-entrainment area 32 below.

Each de-entrainment area 32 has a lower horizontal partition 47 which forms the bottom of its two chambers 37, 38 and the tops of the two chambers 33, 35 of the scrubbing area 31 below.

The inner vertical cylindrical partitions 44 of the areas 32 terminate at their lower parts above the partition 47 and the outer vertical cylindrical partitions 45 of the same areas 32 terminate at their upper parts below the partitions 46 to provide communications for the flow of gas through the de-entrainment areas 32 from the gas outlet chamber 34 of each stage 23 to the gas inlet distribution chambers 33 of the next stage 23.

In each stage 23, the spray headers 28 and valves for each lower gas spray area 31 are located alongside the same but outside the shell 12.

The gas distribution chambers 33 are open below the top of the de-entrainment gas outlet chamber 37 of the next stage 23 below, for passage of de-entrained gas from the latter to the distributing slots 40 for the gas flow chambers of the area 31.

The gas outlet chambers 34 open above into the bottom of the gas inlet chamber 36 of the de-entrainment area 32 next above for the respective gas spray areas 31, for passage of gas to be de-entrained from the respective spray areas 31 to their de-entrainment areas 32.

A well 48 is provided at the bottom of each of the gas outlet chambers 34 with which the pumps 25 are connected by lines 49.

In accordance with the invention, the restricted outlet orifices 43 are not capped. Instead, the heads or nozzles 26 are disposed in the gas outlet chambers 34 adjacent to, but in spaced relation downstream of the gas flow from the gas outlet orifices 43 so as to direct their sprays into the gas spray scrubbing chambers 35 horizontally through the gas outlet orifices 43, throughout the vertical cross-sectional area of chambers 35, so as to cover, Fig. 2, said orifices with the narrowest and most intense portion of the spray entering the spray chamber 35. In this manner all of the gas from chambers 35 in areas 31 is forced to pass through the intense portion of the fine sprays on leaving the spray chambers 35 and before entering the spray de-entrainment chambers 36, 38, 37, in areas 32.

Both chamber areas 31, 32, are unpacked chambers, that is, they are unobstructed to gas flow by packing or equivalent and all passages and orifices are free of solid or continuous phases of liquid as in bubble cap trays so that there is free flow of gas with a low pressure drop from stage 23 to stage 23.

Also, in accordance with this embodiment of the invention, to attain the aforesaid objects, the outer, intermediate, and inner axial chambers of the area 32 of each stage 23 are of at least the same size and the same diameter as, and are axially aligned with, the corresponding outer, intermediate, and inner axial chambers of the lower area 31 of their respective stages.

Hence, the gas is de-entrained by a combination of centrifugal force and gravitational pull at a velocity much lower than the very greatly higher velocities at which the gas entrains liquid in passing through the orifices 43, as a result of the acceleration in flow of the gas in passing through the restricted orifices. This flow is nearly as low as the much lower velocity at which the gas flows in the scrubbing chambers 35 before it undergoes such acceleration.

The vertical cross-sectional area and horizontal volumetric depth of the de-entrainment chambers, of course, may be made still larger for still more efficient de-entrainment, but preferably the diameter of the chambers 33 are each about one third the horizontal diameter of the interior of the shell, so that the combined diameter of the intermediate 35 and outer 34 chambers is also but one third, and the intermediate chambers 35 but three-fifteenths and the outer chambers 34 are two-fifteenths of the diameter of the shell interior. Thus, with an inner shell diameter of 15 feet, the inner axial chambers 33 are about 5 feet in diameter, the outer chambers 34 are 2 feet and the intermediate chambers 35 are 3 feet. The purpose of this is to have the spray chambers 35 not exceed three feet to prevent fine globules of spray to unite into big ones.

The liquid sprayed into the respective gas spray chambers 35 is collected in these chambers in the form of a pool 51 provided with the sump or well 48 so that the liquid may be re-sprayed again into the gas in the same stage. For this, the pumps 25 are connected with the respective wells 48 by lines 49. The inner axial partitions 39 constitute with the wall of the shell 12 and the lower partitions 46 a receptacle for the pool 51.

Overflow of liquid from stage 23 to stage 23 is effected by means of overflow weirs 50 which discharge the excess liquid from each pool 51 of area 31 in each stage 23 through the gas outlet chambers 37 of the area 32 below to the floors 47 of the de-entrainment areas 32, whence the liquid drains down through the overflow conduits 52 from the de-entrainment area 32 to the area 31 of the next stage 23 below, where it commingles in pool 51 of the area 31 of that stage 23 and ultimately is recirculated in the form of a fine spray successively throughout the respective spray areas 31.

The liquid that settles out of the gas stream by de-entrainment in the de-entrainment areas 32 likewise collects on the floor partitions 47 which form the bottoms of areas 32 and the tops of the spray areas 31, the de-entrained collected globules then pass, along with the overflow liquid from the weirs 50 of the spray chamber 35, above, through the overflow conduits 52 to the pool 51 and well 48 of the spray area from which the entrained liquid was carried over.

The corresponding chambers of the upper and lower areas 31, 32, are of constant vertical cross-sectional area from their respective vertical partitions and are of equal depth and breadth, and the gas flow is unimpeded through each of them.

A much lower gas flow velocity thus obtains in the unpacked de-entrainment areas 32 than obtains in the gas spray orifices 43 and consequently the flow velocity of the gas is well below that velocity in which entrained spray may remain in the gas stream leaving the spray chambers as a result of flow through spray orifices 43. Advantageously, therefore, there is little, if any, carryover of spray with the gas from stage 23 to stage 23, notwithstanding the greater intimacy of contact with the more intense portion of the sprays in the spray chambers 35 and orifices 43 as a result of the gas passing at its highest velocity through the narrower and finer portion of the spray cones discharging through the gas outlet orifices 43.

In operation, benzol-laden gas enters the scrubber 12 through lower gas inlet 17 and flows generally upwardly through pass 10 to the top 19 where it leaves the system through the upper gas outlet 18 freed of its benzol content.

Concurrently, absorbent oil solvent, such as straw oil, for benzol or light oil, or other conventional solvent, in fresh debenzolized condition, is fed into the scrubber 12 through the upper liquid inlet 20, whence it is forced through the conical spray heads 26 generally downwardly through the pass 10, countercurrent to the upflowing gas, until the liquid arrives at the lower liquid outlet conduit 22, which delivers the benzol enriched solvent to method and apparatus, as conventional, for stripping the absorbed benzol, or light oil, from the solvent, the denuded solvent then being returned as fresh feed through line 20.

During the course of the countercurrent flow of gas and liquid, they are redistributed into contact with each other as follows:

The fresh feed from line 20, under pressure of pump 25, is discharged horizontally into the topmost spray area 31 from the spray heads 26 beyond the outlet orifices 43, that is, downstream as to gas flow through the orifices 43, so that the sprays flow through the orifices horizontally into gas spray scrubbing chamber 35 with the narrower intense portion of the sprays covering the orifices 43. The spray heads 26 and orifices 43 are spaced from each other so that the wider portions of the cones overlap in chambers 35. The liquid from the sprays collects in the pool 51. From here the liquid is recirculated by pump 25 to the spray heads 26 for that area 31, and excess liquid overflows weir 50 to the de-entrainment area 32 and thence to the well 48 of stage 23 below. In the topmost stage, and for all lower stages 23, the pumps 25 pump the liquor at a higher rate, than the rate at which the fresh liquid is fed in through line 20. The rate of circulation in each stage 23 is governed by the concentration of benzol in the absorbent liquid, the liquid being recirculated until it approaches substantial equilibrium with the gas with respect to the benzol or other constituent to the removed. Excess liquid that overflows each weir 50 to the pool 51 in the next lower gas spray chamber is recirculated therein in the same manner, or at a greater rate, with overflow at weirs 50 of the excess liquid to the next stage, and so on through the remainder of the stages until the liquid arrives at the lower liquid outlet 22.

The gas from the lower gas inlet 17 flows axially in the lowermost chamber 33 and horizontally at a high velocity through the inlet distribution slots 40 into the gas spray scrubbing chamber 35 of the area 31 at the lowermost part of pass 10, whence it flows at a lower but substantially constant velocity through the overlapping spray cones to the outlet orifices 43 through which the spray enters from the heads 26 which spray covers said orifices 43. All gas flows at highest velocity through the spray in the orifices 43 while the orifices 43 are covered by the narrower portion of the sprays of greatest intensity from conical heads 26, and out into the gas outlet chamber 34 leading to spray de-entrainment area 32 thereabove, whence the gas flows with a sudden drop in gas velocity at a much lower velocity than the very high velocities at which the gas entrains liquid in passing through the orifices 43, and the drop in velocity may be to a rate as low as the velocity of the gas flowing through the spray chamber 35 in area 31 and before its acceleration in flow through the restricted orifices 43. The gas continues to flow upwardly in chamber 36, downwardly and radially inward in chamber 38 and axially upwardly in chamber 37 to discharge the gas axially upwardly in chamber 33 for flow through slots 40 for the gas spray area 31 of the next stage 23 above. The spray entrained by the gas in passing through the gas spray area 31 and its outlet orifices 43 loses its velocity or momentum, which sustained it in suspension, by the drop in velocity and centrifugal force of the gas in area 32, and entrained spray drops out of, or settles through, the gas current down to the floor of area 32, whence the liquid flows through the overflow conduit 52 to the liquid pool 51 and the well 48 below the outlet orifices 43 and so is returned by pump 25 to the area 31 in which it was entrained, in commingled relation with the liquid in pool 51, as spray through the heads 26.

From the lowermost spray de-entrainment area 32, the gas continues on in the same manner through each of the next higher succeeding horizontal gas flow stages 23, serially upwardly through the pass 10 until the gas discharges from the upper gas outlet 18 freed of the benzol or other constituent to be removed.

As an example of the high velocities at which the gas is treated with the attainment of substantially equilibrium conditions in respective stages 23, the gas velocity that may be successfully employed are 3 to 5 feet per second through the divergent cones of sprays in the horizontal gas spray chambers 35, and a velocity of 12 to 20 feet per second through the gas outlet ports 43 when fully covered with inflowing spray, with the velocity flow in the gas flow spray de-entrainment chambers 32 no greater than that which obtains in the horizontal gas flow gas spray chamber 35, and with high pressure sprays of 5 to 50 pounds per square inch in the conical heads 26.

In this embodiment of the invention, the gas on entering the spray chambers 35 first meets the spray where the globules are in the regions of the cones of the spray sufficiently close to the spray heads 26 where the fine globules do not as yet unite into big ones.

The oil spray headers 28 and their valves are located at the level of each stage 23 along the outside of the shell 12 and are easily accessible for checking and cleaning from the outside of the shell. The pumps 25 and their motors may be at ground level where they are more conveniently accessible, and manholes are provided in the shell wall for each stage 23 to allow access to the interior for adjustment, cleaning and repair of the parts in the interior of the shell.

The separation of the spray and de-entrainment areas into separate chambers provides a better control of the gas and liquid for re-distribution individualized to the respective equilibrium stages, thus providing for superior absorption with a closer approach to equilibrium conditions between the gas and liquid as they leave the respective stages 23.

The invention as hereinabove set forth is embodied in particular form and manner but may be variously embodied within the scope of the following claims.

I claim:

1. Apparatus for unpacked stage treatment of gas and liquid by countercurrent flow of gas with liquid in the form of a fine spray through unobstructed gas flow spaces in successive stages, comprising: a shell having a gas inlet and a gas outlet and a plurality of separate stages arranged between the gas inlet and the gas outlet for gas flow in series therethrough from the gas inlet to the gas outlet, each stage comprising an unpacked gas distribution chamber, an unpacked gas scrubbing chamber and an unpacked gas outlet chamber, an inlet partition between the distribution chamber and the scrubbing chamber comprising slots for gas to enter the scrubbing chamber from the distribution chamber and baffles overlying the slots, nozzles for spraying liquid in the form of spray across the unpacked scrubbing chamber and against the inlet partition having gas inlet slots, and an outlet partition having restricted outlet ports arranged between the scrubbing chamber and the unpacked gas outlet chamber for constraining all gas to flow through such orifices from the scrubbing chamber on its way to the distribution chamber of the next stage through the gas outlet chamber, each gas scrubbing chamber being unobstructed to gas flow from its inlet partition to its outlet partition, and each gas outlet chamber and each distributing chamber of said stages being unobstructed to gas flow from the gas outlet partition of each stage to the inlet partition of a next stage, and said orifices in the outlet partitions and said slots in the inlet partitions being free of solid or continuous phases of liquid for free flow of gas therethrough for a low pressure drop from stage to stage, the nozzles being located in the gas outlet chamber and set to discharge the spray into the unpacked scrubbing chamber through said outlet orifices so as to cover the gas outlet orifices with the fine and more closely spaced globules of the spray whereby all gas is forced to pass at highest velocity through the more intense portion of the spray on its way to the unpacked gas outlet chamber, and the baffles which overlie the inlet slots of the inlet partition being arranged relative to the nozzles so as to deflect the spray from passing through the slots into the unpacked gas distribution chamber.

2. Apparatus for stage treatment of gas and liquid by countercurrent flow of gas with liquid in the form of a fine spray in successive stages, comprising: a shell having a gas inlet and a gas outlet and a plurality of separate stages arranged between the gas inlet and the gas outlet for gas flow in series therethrough from the gas inlet to the gas outlet, each stage comprising a gas distribution chamber, a gas scrubbing chamber and a gas outlet chamber, a partition between the distribution chamber and the scrubbing chamber comprising slots for gas to enter the scrubbing chamber from the distribution chamber and baffles overlying the slots, nozzles for spraying liquid across the scrubbing chamber and against the partition having gas inlet slots, and a partition having restricted outlet ports arranged between the scrubbing chamber and the gas outlet chamber for constraining all gas to flow through such ports from the scrubbing chamber on its way to the next stage through the gas outlet chamber, the nozzles being located in the gas outlet chamber and set to discharge the spray into the scrubbing chamber through said outlet ports so as to cover the gas outlet ports with the fine and more closely spaced globules of the spray whereby all gas is forced to pass at highest velocity through the more intense portion of the spray on its way to the gas outlet chamber, and the baffles which overlie the inlet slots of the inlet partition being arranged relative to the nozzles so as to deflect the spray from passing through the slots into the gas distribution chamber, and in which the gas flow chambers of each stage are in the form of an inner axial distribution chamber, an intermediate surrounding annular scrubbing chamber, and an outer surrounding annular gas outlet chamber, for axial inflow of the gas to the inner distribution chamber to be distributed, with peripheral distribution therefrom to the gas scrubbing chamber, and radial flow outwardly through the sprays in the scrubbing chamber to the ports and gas outlet chamber containing the nozzles on its way to the axial distribution chamber for the next stage.

3. Apparatus as claimed in claim 2 and in which each stage is provided with a separate common receptacle for collecting the liquid sprayed into the gas scrubbing chamber and the liquid de-entrained in the outer gas outlet chamber, means for recirculating liquid from the receptacle back to the spray nozzles for its stage, and means for overflow of liquid from the receptacle of each stage to the receptacle for the next stage.

4. Apparatus as claimed in claim 2, and in which each stage also comprises a de-entrainment area above the gas flow chambers in the form of an outer annular chamber communicating with the annular gas outlet chamber below, an intermediate annular chamber, and an inner axial chamber communicating with the inner axial distribution chamber of the stage above for passage of gas from the annular gas outlet chamber of each stage to the inner axial distribution chamber of the next stage, the inner, intermediate and outer chamber of each de-entrainment area being connected together for effecting a sudden change in direction of flow of gas passing through said chambers, and being of at least the same depth and the same diameter as, and in axial alignment with the corresponding inner intermediate and outer chambers for distribution, scrubbing, and gas outlet, of the respective stages.

5. Apparatus for contact of gas with liquid in the form of fine sprays comprising a plurality of unpacked stages arranged one above the other for gas flow in series therethrough; each stage comprising a lower gas distribution and spray gas scrubbing area and an upper spray de-entrainment area, the lower area being in the form of an inner axial gas distribution chamber an outer perimetrical annular gas outlet chamber and an intermediate annular spray gas scrubbing chamber and the upper area being in the form of an outer perimetrical annular gas inlet chamber, an inner axial gas outlet chamber and an intermediate annular chamber, the chambers of the upper area being connected together for effecting a sudden change in direction of flow of gas flowing therethrough, and the outer chamber of each upper area communicating with the outer chamber of the lower area below to receive gas therefrom while the inner chamber of each upper area communicates with the inner axial gas distribution chamber of the lower area of the next stage above to deliver gas thereto; each lower area having a partition between the inner axial gas distribution chamber and the intermediate scrubbing chamber with slots for distribution of the inflowing gas and baffles overlying the slots, and a partition between the outer perimetrical chamber and the intermediate chamber with restricted outlet orifices for constraining all gas to flow through the ports at a higher velocity from the intermediate chamber to the outer chamber, and nozzles for spraying liquid across the scrubbing chamber and against the partition having the gas inlet slots; wherein the nozzles are located in the outer perimetrical gas outlet chamber of the lower area of each stage and set to discharge the spray into the intermediate scrubbing chamber through the restricted outlet ports in the partition between the outlet chamber and the intermediate scrubbing chamber so as to cover the gas outlet ports with the fine and more closely spaced globules of the spray whereby all gas in the intermediate scrubbing chamber is forced to pass at highest velocity through the more intense portion of the spray on its way to the gas outlet chamber of each stage, the baffles overlying the inlet slots of the partitions of the lower area of each stage are arranged relative to the nozzles to deflect the sprays from the slots into the scrubbing chamber so that the liquid cannot pass into the gas distribution chamber, and the outer, intermediate, and inner axial chambers of the upper area of each stage are of at least the same size and the same diameter as, and are axially aligned with, the corresponding outer, intermediate, and inner axial chambers of the lower area of their respective stages.

References Cited in the file of this patent

UNITED STATES PATENTS

| Number | Name | Date |
|---|---|---|
| 1,722,466 | Hayes | July 30, 1929 |
| 2,070,578 | Bowman | Feb. 16, 1937 |